US012609908B1

(12) United States Patent
Wolny

(10) Patent No.: US 12,609,908 B1
(45) Date of Patent: Apr. 21, 2026

(54) SELECTIVELY BLOCKING CONNECTION REQUESTS TO ENSURE PRIVACY

(71) Applicant: RealDefense, LLC, Pasadena, CA (US)

(72) Inventor: Grzegorz Jan Wolny, Fontana, CA (US)

(73) Assignee: RealDefense LLC, Pasadena, CA (US)

( * ) Notice: Subject to any disclaimer, the term of this patent is extended or adjusted under 35 U.S.C. 154(b) by 139 days.

(21) Appl. No.: 18/381,915

(22) Filed: Oct. 19, 2023

(51) Int. Cl.
*H04L 9/40* (2022.01)
*G06F 21/62* (2013.01)

(52) U.S. Cl.
CPC ...... *H04L 63/0236* (2013.01); *G06F 21/6245* (2013.01); *H04L 63/0245* (2013.01)

(58) Field of Classification Search
CPC ............. H04L 63/0236; H04L 63/0245; G06F 21/6245
USPC .......................................................... 726/11
See application file for complete search history.

(56) References Cited

U.S. PATENT DOCUMENTS

2011/0302288 A1* 12/2011 Davis .................... G06F 16/957
                                                        709/223
2014/0337991 A1* 11/2014 Croll ....................... G06F 21/60
                                                        726/26

2016/0182537 A1* 6/2016 Tatourian .............. H04L 63/145
                                                        726/23
2018/0101507 A1* 4/2018 Malca ................... G06F 40/143
2021/0141853 A1* 5/2021 Whitney ............... G06F 16/986
2021/0185064 A1* 6/2021 Roy ..................... H04L 63/0236
2021/0243158 A1* 8/2021 Fandli ................. H04L 63/0236
2023/0300031 A1* 9/2023 Wu ......................... G06F 9/545
                                                        709/220
2025/0119409 A1* 4/2025 Chadalavada ...... H04L 63/0281

* cited by examiner

*Primary Examiner* — Zi Ye

(74) *Attorney, Agent, or Firm* — Brokaw Patent Law, PC; Christopher J. Brokaw

(57) ABSTRACT

Promoting privacy while using a computer network. An operating system kernel-level process, having kernel-level access privilege, filters packets received over the computer network. When doing so, the header of a packet is examined to identify an origin of the packet. Upon determining that the origin of the packet is associated with a blacklist of entities, a connection request made a script comprised within the packet is blocked. However, upon determining that the origin of the packet is not associated with a blacklist of entities, an application executing upon the operating system is granted permission to have access to a payload of the packet. The application may be a web browser which can police the behavior of scripts within a web page while rendering the contents of the web page without alteration.

21 Claims, 2 Drawing Sheets

210

EXAMINE A HEADER OF A PACKET TO DETERMINE ITS ORIGIN

UPON DETERMINING THAT THE ORIGIN OF THE PACKET IS ON A BLACKLIST, BLOCK A CONNECTION REQUEST COMPRISED WITHIN THE PACKET

220

UPON DETERMINING THAT THE ORIGIN OF THE PACKET IS NOT ON A BLACKLIST, PROVIDE AN APPLICATION ACCESS TO THE PAYLOAD OF THE PACKET

230

SELECTIVELY BLOCKING CONNECTION REQUESTS TO ENSURE PRIVACY

FIELD OF THE INVENTION

Embodiments of the invention generally relate to improved approaches for protecting the privacy of the user accessing a network by preventing personal data to be shared with others over the network without consent.

BACKGROUND

Certain companies and organizations, such as those involved with advertising and marketing analytics, collect information about the people visiting a web site. Such information may include (a) information about the visitor, such as the physical location of that person or their web browsing history, or (b) information about the physical device used to browse the web page, such as its graphics resolution or screen size. To collect such information, a tracking script may be added to the text forming a web page. When a web browser renders a requested web page that includes a tracking script, the web browser also executes the tracking script as it renders the content defined by the web page. In doing so, the web browser may communicate with a web server to retrieve a requested web page using the Hyper Text Transfer Protocol (HTTP) as a series of Request/Response calls and associated Context flows. In order to load a requested web page, a web browser typical processes multiple Request/Responses before rendering the HTML content defined by the web page.

The execution of the tracking script by the web browser causes the web browser to provide whatever information is being requested by that tracking script to a third party located across the Internet. That third party, who is often different than the party hosting the requested web page, may use such information for a variety of purposes, including targeted adverting and/or selling the collected information to other interested parties.

Users of web browsers are generally aware of this practice of data collection and there is widespread recognition of the need to have greater control over how their personal information is shared with others. To that end, the prior art has relied upon the use of web browser extensions, which are small modules of executable code that are designed to work with a particular web browser to perform certain functions. For example, in the prior art there have been web browser extensions designed to (a) identify tracking scripts within a requested web page, and (b) prevent the operation of some or all of the identified tracking scripts based on some methodology.

For a web browser extension to work with a particular web browser, the manufacturer of the web browser must consent, as the web browser must be permitted to recognize and trust the web browser extension. Over time, manufacturers of web browsers have been granting fewer permissions to web browser extensions to work with their web browsers; this is particularly true with web browser extensions designed to block tracking scripts as tracking scripts help generate advertisement revenue for the web browser manufacturers and their customers. As a result, over time, web browser extensions designed to manage the operation of tracking scripts are being phased out of widespread use. Consequently, those who access web content and other content across networks are faced with increasingly fewer options to address their desire for privacy and control over their personal information.

There have been other approaches in the prior art designed to safeguard the privacy of a user against the spread of their personal information by way of tracking scripts comprised within web pages. U.S. Pat. No. 10,049, 231 (the '231 patent') is entitled Method and System for Obfuscating the Properties of a Web Browser. The '231 patent discusses an application which provides a set of counterfeit or obfuscated data to a web browser to use in responding to a request for information originating from a tracking script. However, the prior art still possesses a need to better empower a user to be in control over how information about themselves is collected and shared with others by tracking scripts.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for selectively blocking connection requests made by tracking scripts are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Embodiments of the invention may be used to protect the privacy of the user accessing a network, such as but not limited to the Internet, by preventing personal data to be shared with others over that network without their consent. To do so, tracking scripts which may be, either knowingly or unknowingly, present in material that is accessed over the network may be identified by embodiments of the invention and, if not pre-approved, their execution may be blocked at the operating system kernel level. Advantageously, embodiments may be used to protect the privacy of a user accessing a public or private network using any type of application that executes upon an operating system. Thus, while embodiments shall be chiefly described in reference to specific examples involving web browsers, embodiments of the invention may with any type of application, including document editors, spreadsheet applications, image viewers, and the like.

Figure 1:
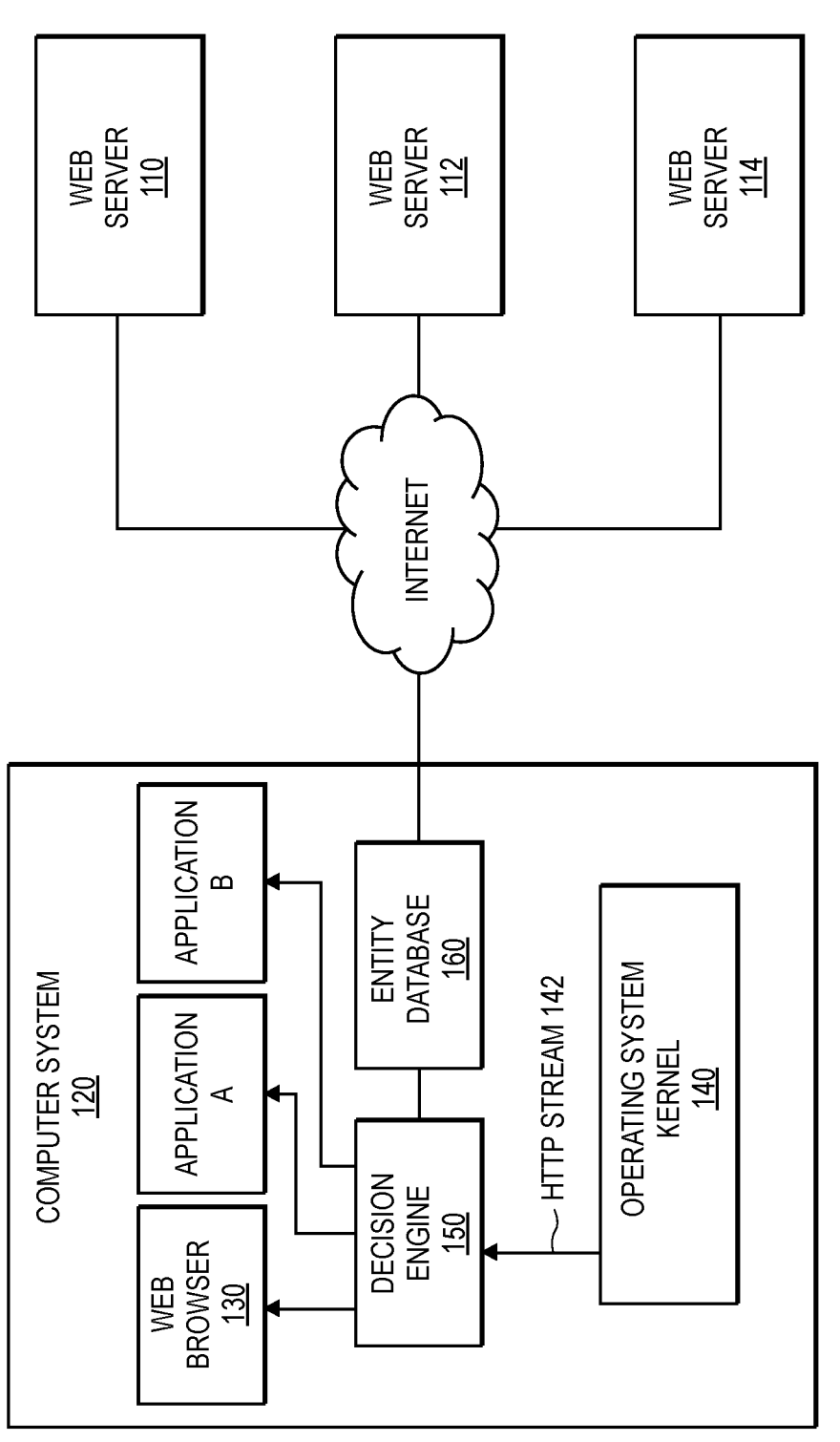
FIG. 1 is an illustration of a system for selectively blocking connection requests made by tracking scripts in accordance with an embodiment of the invention.

FIG. 1 is an illustration of a system for selectively blocking connection requests made by tracking scripts in accordance with an embodiment of the invention. Web servers 110, 112, and 114, as broadly used herein, represent any source of content, such as but not limited to, a web page, that may be requested by a computer system across a network. As shown in the concrete example of FIG. 1, embodiments may be embodied on computer system 120 which requests content, such as a web page, from a web server over the Internet. Embodiments of the invention may also operate in relation to other networks besides the Internet, including any public or private network over which computer system 120 may request content.

Computer system 120, as broadly used herein, represents any physical device having one or more processors which may execute one or more sequences of instructions stored on one or more non-transitory computer-readable storage mediums. The term "non-transitory computer-readable storage medium" as used herein refers to any tangible medium that participates in persistently storing instructions or operational guidance which may be provided to a processor for execution. The concept of a computer system is well-understood to those in the art, and a detailed description need not be presented herein to facilitate understanding of how to make and use embodiments of the invention. Additional details of the physical implementation of computer system 120 is available at U.S. Pat. No. 9,244,682, granted Jan. 26, 2016, entitled, Idle Detection, the entire disclosure of which is hereby incorporated by reference for all purposes as if fully set forth herein.

Upon computer system 120, a variety of different types and numbers of applications may execute. For example, FIG. 1 depicts three different applications executing on computer system 120, namely web browser 130, application A, and application B. Applicant A and B both represent any type of application which may execute upon an operating system, and include any application that renders, displays, processes, and/or interprets data obtained over the computer network, such as the Internet. Thus, embodiments are application-type agnostic and may be use any type of application. While FIG. 1 depicts web servers, other embodiments of the invention may be used with application which retrieve data from other types of servers or sources across a network other than those considered to be a web server.

Operating system (OS) kernel 140 refers to the core portion of an operating system that remains in memory at all times and facilitates interactions between the hardware and software components of a computer system. As such, OS kernel 140 has access to any network traffic received at computer system 120. OS kernel 140 may provide, either proactively or in response to a request issued from decision engine 150, the stream of network traffic, or a portion thereof (such as one or more packets in whole or in part), received at computer system 120, represented in FIG. 1 as HTTP stream 142.

Decision engine 150 refers to software designed to selectively block connection requests made by tracking scripts. The functions performed by decision engine 150 shall be described in greater detail below with reference to FIG. 2; in brief, decision engine 150 reviews HTTP stream 142 obtained from OS kernel 140 for purposes of determining how to handle any tracking scripting embedded within HTP stream 142. In making such determinations, decision engine 150 may consult entity database 160.

Entity database 160, as broadly used herein, refers to any mechanism for storing information about entities that are known to perform identity tracking. Thus, while a database may be used to implement entity database 160 in an embodiment, other embodiments may implement entity database 160 using other types of data structures, files, or such mechanisms. Entities that are included in entity database 160 as performing identity tracking may, by virtue of embodiments of the invention, be unable to have their tracking scripts executed upon computer system 120. For this reason, in an embodiment, the information stored by entity database 160 may be referred to, or arranged as, a blacklist that identifies entities that are known to perform identify tracking.

While FIG. 1 depicts entity database 160 as residing on computer system 120, in other embodiments note depicted in FIG. 1, entity database 160 may reside upon a different physical device than computer system 120, such as one accessible to computer system 120 over the Internet. For example, in such an embodiment, entity database 160 may correspond to a public database of known distributors of tracking scripts. In some embodiments, both a local entity database resident on computer system 120 as well as a remote entity database, located external to computer system 120 but accessible over a network, may be consulted and employed.

Decision engine 150 may employ an operating system (OS) access application program interface (API) to issue requests or to obtain information, such as HTTP stream 142, from OS kernel. An OS access API, as broadly used herein, refers to any API which may be used by an application to issue requests to an operating system for the performance of an operation system level function. Non-limitation, illustrative examples of an OS access API include Microsoft windows Filtering Platform (WFP) and Linux Netfilter application program interface.

Figure 2:
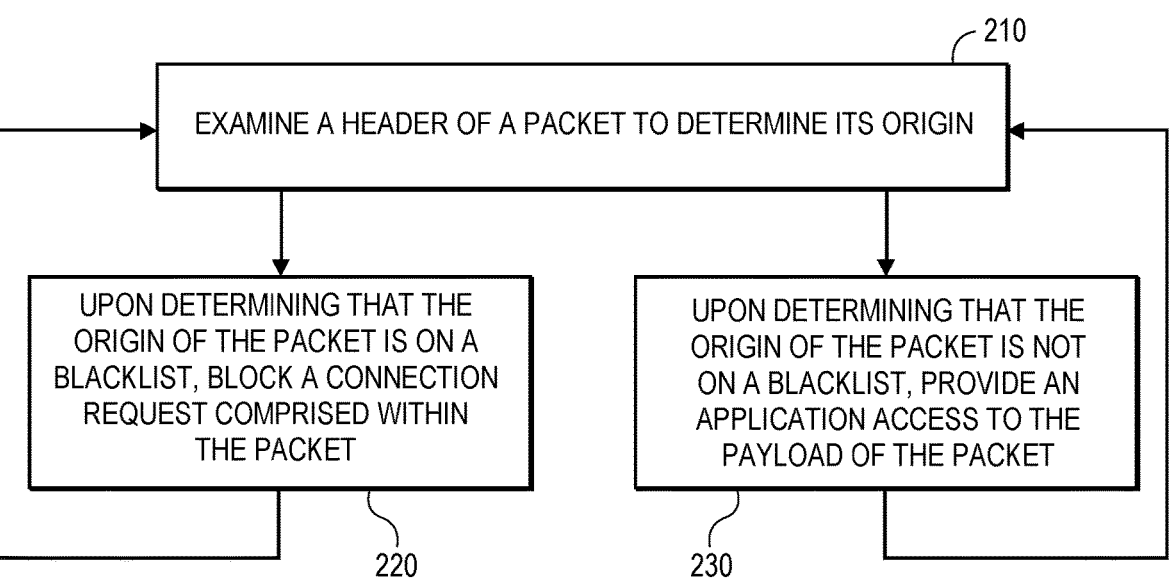
FIG. 2 is a flow chart illustrating the functional steps of selectively blocking connection requests made by tracking scripts in accordance with an embodiment of the invention art.

FIG. 2 is a flow chart illustrating the functional steps of selectively blocking connection requests made by tracking scripts in accordance with an embodiment of the invention art. As shown in FIG. 2, the steps of FIG. 2 may be performed repeatedly upon each packet received by computer system 120 over a network, such as the Internet. The packets being processed by the steps of FIG. 2 may be packets that have been requested from a source over the network by any application executed upon computer system 120, such as web browser 130 or application A.

Initially, in step 210, a header of a packet is examined to determine its origin. Step 210 may be performed by decision engine 150 issuing one or more calls to OS kernel 140 using an OS access API. In an embodiment, decision engine 150 may perform step 210 each time that a packet is received from the network. In other embodiments, decision engine 150 may perform step 210 each time a specified condition is satisfied or not satisfied, e.g., a user or application may instruct decision engine 150 to initiate or cease performing the steps of FIG. 2 for packets received over the network.

In response to being instructed by decision engine 150 via an OS access API, OS kernel 140, being an operating system kernel-level process that has kernel-level access privilege, reviews each received packet to look for the header of a Hyper Text Transfer Protocol (HTTP) Request, which contains information that identifies the entity or origin issuing the request.

Upon identifying the entity or origin issuing the request, decision engine 150 consults entity database 150 to determine if the identified entity or origin is stored within entity database 150. To do so, decision engine 150 may determine if the IP address or domain name of the recipient of information requested by a tracking script matches any comprised within entity database 150.

Upon determining that the origin of the packet is on the blacklist or otherwise matches information stored in entity database 150, step 220 is performed. In step 220, a connection request comprised within the packet is blocked, i.e., the connection requested by the tracking script is denied. Processing with the remainder of the requested item, be it a web page, file, or the like, may proceed as normal as it will appear as if the destination to which the information requested by the tracking script is inaccessible by computer system 120.

On the other hand, upon determining that the origin of the packet is not on the blacklist or otherwise does not match information stored in entity database 150, step 230 is performed. In step 230, an application is provided access to the payload of the packet. In other words, the contents in the packet can be delivered to the appropriate application executing on computer system 120 handling that data. For example, if the contents of the packet correspond to all or a portion of a web page being requested by web browser 130, then the payload of the packet is provided to web browser 130 for processing. On the other hand, if the contents of the packet correspond to data requested by application A or by application B, then similarly those contents are then provided to the requesting application.

As shown in FIG. 2, after either step 220 or step 230 is performed, processing proceeds to the next packet in the series of received packets. In this way, the entirety of all network traffic received by computer system, including but not limited to HTTP stream 142, may be processed in the fashion shown in the flowchart of FIG. 2.

Embodiments of the invention can safeguard the user's personal information without sacrificing any of the intended user experience. For example, in an embodiment wherein web browser 130 requests a web page from web server 112, when web browser 130 renders the requested web page, the web page will be rendered in full without the removal of any content associated with any tracking script embedded therein. However, the connection request made by the tracking script will be denied by decision engine 150 if the entity associated with the tracking script is stored by entity database 160. Thus, the packets associated with the majority of the web page may be processed by web browser 130; however, any packet associated with a tracking script whose origin or associated entity is identified within information stored by entity database 160 will not be permitted to establish a connection, and the web page will be subsequently processed and rendered by web browser 130 as if the destination to which information is requested to be sent by the tracking script is unreachable.

Embodiments of the invention may allow a user to consent to a tracking script or allow certain actions to take place, such as the storage of a cookie on computer system 120. While other prior art approaches involve the user consenting to the storage of a cookie, it is important to note that embodiments are performing this function at the OS kernel level by way of decision engine 150 instructing using OS kernel 140. For example, in an embodiment, upon decision engine 150 determining that the origin of a packet is stored within entity database 160, decision engine 150 and/or OS kernel 140 may inform the user that a tracking script has been detected in a received network communication and request instruction from the user to either (a) acquiesce to the normal processing of the tracking script (thereby allowing the tracking script to be executed) or deny use of the identified tracking script as well as adding the origin of that tracking script to entity database 160.

In further embodiments of the inventions, when performing step 220, instead of or in addition to blocking a connection request, one or more additional actions may be performed, such as but not limited to denying a process associated with the tracking script access to a microphone, denying a process associated with the tracking script access to a camera, and denying a process associated with the tracking script access to information about the physical location of computer system 120.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage mediums storing one or more sequences of instructions for promoting privacy while using a computer network, which when executed, cause:

an operating system kernel-level process, having kernel-level access privilege, filtering packets received over the computer network, comprising for each of said packets:

upon a computer receiving, over the computer network, an entirety of a packet comprising a header and a payload, providing access to said packet to said operating system kernel-level process executing on said computer, wherein said header of said packet is separate from said payload of said packet;

said operating system kernel-level process examining the header of the packet to identify an origin of the packet;

upon said operating system kernel-level process determining that the origin of the packet is associated with a blacklist of entities, said operating system kernel-level process providing, to an application executing upon an operating system of the computer, access to an entirety of the payload of the packet while said operating system kernel-level process blocking at least one connection request made by a script comprised within the payload of the packet; and upon said operating system kernel-level process determining that the origin of the packet is not associated with a blacklist of entities, said operating system kernel-level process permitting said application executing upon the operating system to have access to the entirety of the payload of the packet without said operating system kernel-level process blocking said any connection requests originating from a script in the payload.

2. The one or more non-transitory computer-readable storage mediums of claim 1, wherein the application is a web browser which, when rendering a web page defined by data carried by said packets including said packet, renders said web page without removing any content associated with said script.

3. The one or more non-transitory computer-readable storage mediums of claim 1, wherein the blacklist is implemented, at least in part, using at least one database.

4. The one or more non-transitory computer-readable storage mediums of claim 1, wherein said database resides across the computer network upon a different physical device than said one or more non-transitory computer-readable storage mediums.

5. The one or more non-transitory computer-readable storage mediums of claim 1, wherein said operating system kernel-level process possesses said kernel-level access privilege using a Windows Filtering Platform application program interface or Linux Netfilter application program interface.

6. The one or more non-transitory computer-readable storage mediums of claim 1, wherein said application renders, displays, processes, and/or interprets data obtained over the computer network.

7. The one or more non-transitory computer-readable storage mediums of claim 1, wherein said application is a web browser or a document editor.

8. The one or more non-transitory computer-readable storage mediums of claim 1, wherein said blacklist identifies entities that are known to perform identify tracking.

9. The one or more non-transitory computer-readable storage mediums of claim 1, wherein said operating system kernel-level process, in consultation with said blacklist, permits a first portion of packets, associated with a web page, that are not identified by said blacklist, to be processed by said application while not permitting a second portion of packets, associated with said web page, that are identified by said blacklist, to be processed by said application.

10. The one or more non-transitory computer-readable storage mediums of claim 1, wherein upon determining that the origin of the packet is associated with a blacklist of entities, the execution of the one or more sequences of instructions further cause:

informing a user that a tracking script has been detected in a received network communication, wherein said tracking script provides, over the computer network, a set of information about the user or a device of the user to a third party that is separate from a source of said received network communication; and requesting instruction from the user to acquiesce to processing of the tracking script or deny use of the tracking script.

11. An apparatus for promoting privacy while using a computer network, comprising:

one or more processors; and one or more non-transitory computer-readable storage mediums storing one or more sequences of instructions, which when executed, cause:

an operating system kernel-level process, having kernel-level access privilege, filtering packets received over the computer network, comprising for each of said packets:

upon a computer receiving, over the computer network, an entirety of a packet comprising a header and a payload, providing access to said packet to said operating system kernel-level process executing on said computer, wherein said header of said packet is separate from said payload of said packet;

said operating system kernel-level process examining the header of the packet to identify an origin of the packet;

upon said operating system kernel-level process determining that the origin of the packet is associated with a blacklist of entities, said operating system kernel-level process providing, to an application executing upon an operating system of the computer, access to an entirety of the payload of the packet while said operating system kernel-level process blocking at least one connection request made by a script comprised within the payload of the packet; and upon said operating system kernel-level process determining that the origin of the packet is not associated with a blacklist of entities, said operating system kernel-level process permitting said application executing upon the operating system to have access to the entirety of the payload of the packet without said operating system kernel-level process blocking said any connection requests originating from a script in the payload.

12. The apparatus of claim 11, wherein the application is a web browser which, when rendering a web page defined by data carried by said packets including said packet, renders said web page without removing any content associated with said script.

13. The apparatus of claim 11, wherein the blacklist is implemented, at least in part, using at least one database.

14. The apparatus of claim 11, wherein said database resides across the computer network upon a different physical device than said one or more non-transitory computer-readable storage mediums.

15. The apparatus of claim 11, wherein said operating system kernel-level process possesses said kernel-level access privilege using a Windows Filtering Platform application program interface or Linux Netfilter application program interface.

16. The apparatus of claim 11, wherein said application renders, displays, processes, and/or interprets data obtained over the computer network.

17. The apparatus of claim 11, wherein said application is a web browser or a document editor.

18. The apparatus of claim 11, wherein said blacklist identifies entities that are known to perform identify tracking.

19. The apparatus of claim 11, wherein said operating system kernel-level process, in consultation with said blacklist, permits a first portion of packets, associated with a web page, that are not identified by said blacklist, to be processed by said application while not permitting a second portion of packets, associated with said web page, that are identified by said blacklist, to be processed by said application.

20. The apparatus of claim 11, wherein upon determining that the origin of the packet is associated with a blacklist of entities, the execution of the one or more sequences of instructions further cause:

informing a user that a tracking script has been detected in a received network communication, wherein said tracking script provides, over the computer network, a set of information about the user or a device of the user to a third party that is separate from a source of said received network communication; and requesting instruction from the user to acquiesce to processing of the tracking script or deny use of the tracking script.

21. A method for promoting privacy while using a computer network, comprising:

an operating system kernel-level process, having kernel-level access privilege, filtering packets received over the computer network, comprising for each of said packets:

upon a computer receiving, over the computer network, an entirety of a packet comprising a header and a payload, providing access to said packet to said operating system kernel-level process executing on said computer, wherein said header of said packet is separate from said payload of said packet;

said operating system kernel-level process examining
the header of the packet to identify an origin of the
packet;

upon said operating system kernel-level process deter-
mining that the origin of the packet is associated with
a blacklist of entities, said operating system kernel-
level process providing, to an application executing
upon an operating system of the computer, access to
an entirety of the payload of the packet while said
operating system kernel-level process blocking at
least one connection request made by a script com-
prised within the payload of the packet; and upon said operating system kernel-level process deter-
mining that the origin of the packet is not associated
with a blacklist of entities, said operating system
kernel-level process permitting said application
executing upon the operating system to have access
to the entirety of the payload of the packet without
said operating system kernel-level process blocking
said any connection requests originating from a
script in the payload.

* * * * *